No. 668,507. Patented Feb. 19, 1901.
C. M. FISK.
RECEPTACLE FOR LIVE BAIT, &c.
(Application filed June 8, 1900.)
(No Model.)
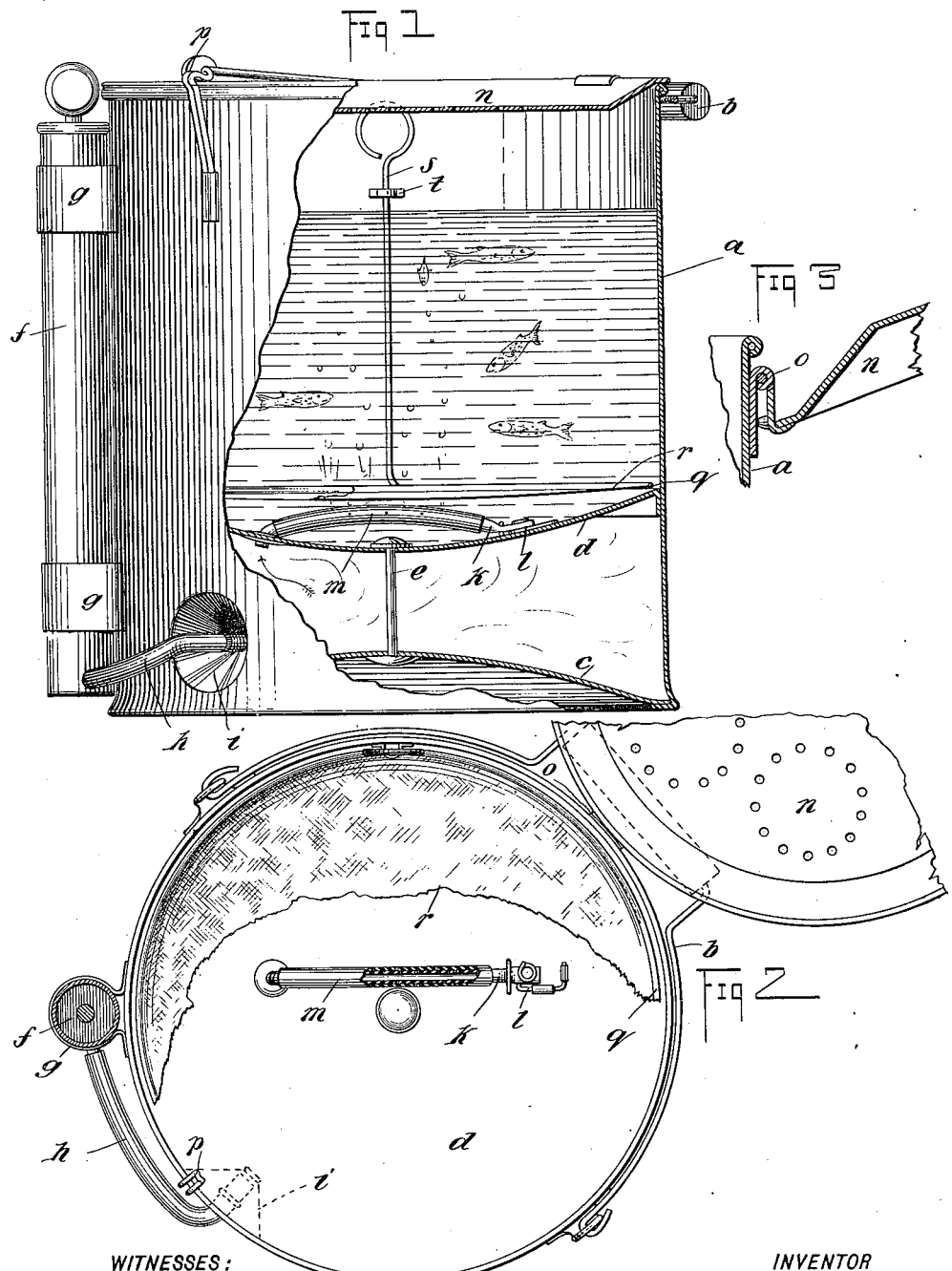
WITNESSES:
INVENTOR
Cassius M. Fisk.
BY
ATTORNEYS

UNITED STATES PATENT OFFICE.

CASSIUS M. FISK, OF NAPOLEON, OHIO.

RECEPTACLE FOR LIVE BAIT, &c.

SPECIFICATION forming part of Letters Patent No. 668,507, dated February 19, 1901.

Application filed June 8, 1900. Serial No. 19,497. (No model.)

*To all whom it may concern:*

Be it known that I, CASSIUS M. FISK, a citizen of the United States, and a resident of Napoleon, in the county of Henry and State of Ohio, have invented a new and Improved Bait and other Live-Fish Receptacle, of which the following is a full, clear, and exact description.

This invention relates to an improved appliance for keeping fish alive and for facilitating their transportation from place to place.

The device is adapted particularly for the reception of live bait, such as minnows, shrimp, and the like.

This specification is the disclosure of one form of the invention, while the claims define the actual scope thereof.

Reference is to be had to the accompanying drawings, forming a part of this specification, in which similar characters of reference indicate corresponding parts in all the views.

Figure 1 is an elevational view of the invention with parts broken away. Fig. 2 is a plan view with parts broken away, and Fig. 3 is a detail view showing the manner of mounting the hinged lid.

The apparatus as here shown is constructed with a main or body part $a$ in the form of a pail, having a bail $b$, by which it may be carried. The bottom $c$ of the pail is concave, and just above the bottom is arranged a partition $d$, which is concave at its top and hermetically fastened in the pail to form two compartments, the lower of which serves as an air-container and the upper of which serves as a water-reservoir. The parts $c$ and $d$ are braced against each other by a rod $e$, extending between them and fastened thereto. A hand-pump $f$ is fastened by clips $g$ to the outer side of the pail $a$ and has a discharge-pipe $h$ passing therefrom and leading into the air-container, the pail having a funnel-shaped nozzle $i$, into which the pipe $h$ leads. By operating the pump $f$ the air-container may be filled with air under pressure. A flexible pipe $k$ has one end passed through the partition $d$ into communication with the air-container, the bent portion of the pipe $k$ lying above the partition $d$ and the opposite end being removably secured and closed by a spring-clip $l$, fastened to the partition $d$. The pipe $k$ is perforated and has a second pipe or flexible sleeve $m$ passed over it, so as to inclose the pipe $k$. The sleeve $m$ is also perforated; but the perforations of the pipe $k$ and sleeve $m$ are out of registry, so that normally the pipe $k$ is sealed. When, however, sufficient air-pressure is created within the air-container, the air forces its way into and through the pipe $k$ and escapes into the water-reservoir. This reservoir is adapted to be filled or partly filled with water, as indicated in Fig. 1, and the fish placed therein, so that the air continually escaping into the water-reservoir will aerate the water and enable the fish to live in the water.

It is pointed out that the air may be compressed to a relatively high pressure in the air-container, and by means of the peculiarly-arranged distributing-pipes $k$ and $m$ a gradual discharge of air is permitted, thus keeping the water continually supplied with air and necessitating the operation of the pump only at comparatively long intervals.

The pail is provided with a perforated lid or cover $n$, connected with the pail by a hinge $o$ and of dished form, so that its central portion lies down slightly within the pail. A spring-catch $p$ is situated opposite the hinge $o$ to hold the cover closed. For the purpose of readily lifting the fish out of the water-receptacle I provide a sort of net in the form of a circular frame $q$, fitting within the water-reservoir and carrying a fabric $r$, so that when the ring $q$ is raised the fabric will be lifted and the fish will be drawn out of the water. To the ring $q$ is attached a handle $s$, vertically movable in a guide $t$, fastened to the side of the pail.

Having thus described my invention, I claim as new and desire to secure by Letters Patent—

1. A live-fish receptacle, comprising a pail, a partition therein, the partition forming an air-container and a water-reservoir, and means for retarding the flow of air from the air-container to the water-reservoir.

2. A receptacle for live fish, having a water-reservoir, and a device for controlling the supply of air thereto, such device comprising an inner and an outer flexible tube with perforations therein out of registry with each other.

3. A reservoir for live fish, having a water-reservoir, and means for controlling a supply of air thereto, such means comprising a flexible tube leading into the water-reservoir, and a clip for removably holding one end of the tube closed, said tube being perforated intermediate its ends.

4. A live-fish receptacle, comprising a pail, a partition therein, the partition forming an air-container and a water-reservoir, means for retarding the flow of air from the air-container to the water-reservoir, and a pump carried by the pail and communicating with the air-container to force air thereinto.

In testimony whereof I have signed my name to this specification in the presence of two subscribing witnesses.

CASSIUS M. FISK.

Witnesses:
 W. A. HANNA,
 C. M. PHILLIPS.